United States Patent
Piagnoli

[11] 3,730,403
[45] May 1, 1973

[54] MILK KETTLE FOR DOMESTIC USE

[76] Inventor: Aldo Piagnoli, Via Nino Bixio, 4/15 A sc. D, 16128 Genova, Italy

[22] Filed: June 16, 1970

[21] Appl. No.: 46,752

[30] Foreign Application Priority Data

June 16, 1969 Italy....................7105 A/69

[52] U.S. Cl.................................222/572
[51] Int. Cl................................D65d 25/44
[58] Field of Search.............222/564, 572, 146 H, 222/146 HE; 220/20, 20.5; 215/6; 31/2; 150/360; 99/403, 410, 316–318, 192

[56] References Cited

UNITED STATES PATENTS

| | | | |
|---|---|---|---|
| 1,927,701 | 9/1933 | Ferrando | 99/316 X |
| 2,850,391 | 9/1958 | Gunsberg | 99/192 |
| 1,728,572 | 9/1929 | Pearson | 99/317 |

FOREIGN PATENTS OR APPLICATIONS

| | | | |
|---|---|---|---|
| 13,501 | 2/1911 | France | 99/316 |
| 807,354 | 1/1959 | England | 99/403 |
| 1,222,451 | 1/1960 | France | 99/403 |

Primary Examiner—Samuel F. Coleman
Assistant Examiner—Norman L. Stack, Jr.
Attorney—Michael S. Striker

[57] ABSTRACT

A kettle for heating and boiling milk, and consisting of a substantially conventional vessel having side and bottom walls, and further provided with a partition wall parallel to and spaced from the said bottom wall at a level generally of the order of one tenth of the overall height of the vessel, said partition wall being apertured at a position formed adjacently to a brief arc of the side wall, the area of the thus formed passage being generally from two to five percent of the area of said partition wall, the kettle being designed to effectively prevent boiling over of the milk.

5 Claims, 5 Drawing Figures

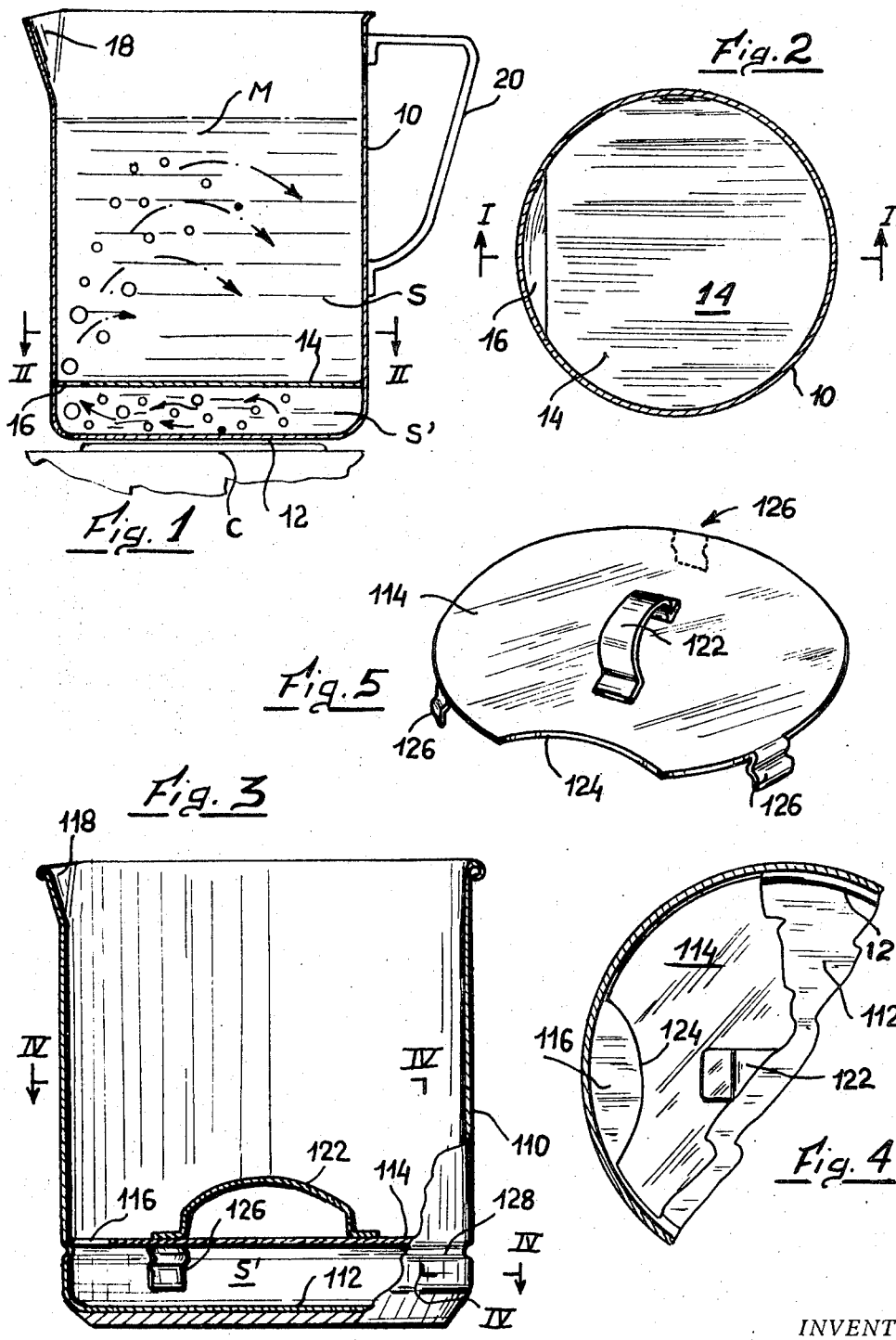

MILK KETTLE FOR DOMESTIC USE

BACKGROUND OF THE INVENTION

This invention is concerned with a new and improved milk kettle, i.e. with a metallic pot or vessel designed to be positioned above a suitable source of heat, such as the heating element of an electric range or the burner of a gas stove, in particular for domestic use, for heating and boiling milk therein. More particularly, the invention is concerned with an improved milk kettle capable of preventing or at least effectively minimizing the chance of rising and overflowing of milk when boiling.

The fact that milk abruptly "boils over" when heated is well known to anybody. This event occurs by reason of the nature of milk which, when bubbles of vapor are being formed where its temperature is the highest, that is at its lowest layer adjacent to the bottom wall of the kettle, such bubbles cannot overcome the surface tension of milk and escape at the liquid surface. The boiling milk becames a foamy mass of rapidly increasing volume and "boils over" the edge of the cooking vessel.

This event is of great disturbance, apart from the wasting of a substantial part of the heated milk. The overflowed milk falls outside the kettle, contacts the hot heating element or the flame of the burner, causes soiling of the range or stove, bad odors and so on. When a gas stove is made use of, the overflowing milk extinguishes the flame and the continued outflow of gas leads to well known very serious danger of intoxication, explosion and others.

Many types of milk kettles intended to limit such very undesirable nuisance and also danger have been proposed and manufactured. Such prior art kettles are generally provided with a perforated plain or variously shaped cover or diaphragm positioned at the upper portion of the vessel, at a short distance from the upper edge thereof, for the purpose of slowing down or limiting the rise and overflowing of the boiling foamy mass of milk. Such prior art kettles have acknowledgedly been proved far from being as effective as desirable.

It is therefore an object of this invention to provide a new and improved milk kettle for domestic use, which is surprisingly effective and simple of construction and service.

THE INVENTION

In brief, the improved kettle of the invention comprises an essentially conventional upwardly open vessel characterized in that it is provided with an essentially horizontal partition wall located at a short vertical distance from the bottom wall of the vessel, said partition wall having one or more passages adjacent to the vessel's side wall and of area greatly smaller than the area of same partition wall. Preferably, said partition wall is located from one to two centimeters above the vessel's bottom wall, generally at one tenth of the height of the kettle. Further, the passage is formed by a cutout in the contour of said partition wall.

Still further, the passage or passages are vertically aligned with the conventional spout formed in the upper edge of the vessel or pot to ensure complete pouring off of the milk present in the chamber thus formed below said partition wall. Preferably, aid partition wall is removably secured within the vessel or kettle, for complete cleaning of the same.

These and other features and advantages of the invention will be made apparent form the following detailed description of few embodiments thereof and with reference to the accompanying drawings.

THE VIEW OF THE DRAWING

FIG. 1 is a vertical sectional view of a simplified embodiment of the invention, taken in its symmetry plane indicated at I—I of FIG. 2;

FIG. 2 which is a cross-sectional view the same embodiment, taken in the horizontal plane indicated at II—II in FIG. 1;

FIG. 3 is a vertical sectional view similar to that of FIG. 1, and partly a side elevation, of a most preferred embodiment;

FIG. 4 is a fragmentary cross-sectional view of the kettle of FIG. 3, taken at the planes indicated at IV—IV—IV—Iv in said FIG. 3; and FIG. 5 is a perspective view of the partition wall removed from the kettle of FIGS. 3 and 4.

DETAILED DESCRIPTION OF THE PREFERRED EMBODIMENTS

Referring first to FIGS. 1 and 2, there is shown a milk kettle comprising a kettle body or pot 10 of essentially conventional configuration, essentially vertically extended, having preferably but not necessarily a cylindrical side wall, a planar bottom wall 12, a spout 18 and a handle or kettle holder 20. Said pot is conventionally made of sheet metal, such as by being punched or turned or spun from aluminum sheet, according to current art.

According to the invention, the kettle comprises a horizontal partition wall 14, the edge or contour of which, adjacent to the side wall of the vessel, is discontinued or recessed to from a passage 16 of small area relatively to the cross-sectional area of the kettle, said passage 16 being adjacent to said side wall and vertically aligned with the spout 18.

The interior of the vessel, adapted to contain the desired amount or mass M of milk, is divided by wall 14 into two spaces, that is a space S above the wall 14 and a space S' beneath said wall.

The lower space S' is of a volume greatly smaller than that of upper space S because the partition wall 14 is spaced only a small distance from the bottom wall 12. Preferably, such partition wall is positioned from one centimeter to two centimeters above the bottom wall. More preferably, the vertical distance between bottom and partition wall is about one tenth of the overal height of the kettle.

The opening or aperture 16 can be formed by cutting off a circular segment from the partition wall, which can be formed from a metal sheet also, the chord of said segment being about half of the diameter of the kettle. Generally, the area of the passage 16 is chosen to comprise between 2 to 5 percent of the entire area of the partition wall. The above preferred values are however indicative but not limiting of the invention.

In addition, it is preferred that, as shown, the opening 16 is adjacent to a portion of the side wall, which forms part of the contour of said opening, so that all amount of milk, present in the lower space S', can be easily poured off through the spout 18. Such adjacency is not however critical, provided that the passage (or passages) is formed well near to the said side wall and greatly asymmetrical in the vessel.

It has been surprisingly found that the provision of a partition wall, positioned and apertured as shown or essentially as above, is extremely effective for minimizing and actually zeroing the chance of milk boiling over. It is believed that the bubbles, formed adjacently to the bottom wall 12, superimposed to a suitable source C of heat (such has an electric heating element, for example) are caused to flow through the opening 16 following a path as approximately indicated by arrows in FIG. 1 and then condense in the less hot mass of milk, present in the upper space S, the said less hot mass being a great deal bigger that the boiling mass present in the lower space S'.

Preferably, the improved kettle is constructed as shown in FIGS. 3 to 5 and most preferably but not necessarily made of stainless steel sheet. In such event, its bottom wall 112 is provided with an external pretty thick layer of copper or preferably of aluminum for better heat transmission, as known in the art of cooking pots.

The kettle, provided with a spout 118 and with a suitable kettle holder (not shown), comprise a removable horizontal partition wall 114 having a concave cutout at 124 to form the passage 116. The partition wall 114 is positioned and maintained at the desired level in the kettle, by placing it into abutment from above on an inwardly protruding rib 128 formed in the kettle side wall. Other means such as a plurality of evenly spaced inward projections can however be provided for defining the proper position of the partition wall. Similarly, various means cen be provided for detachably securing the said partition wall in place and for expediting the removal and positioning thereof.

For example, the embodiment shown in FIGS. 3 to 5 has a partition wall provided with a handle 122 and with a plurality of resilient downwardly skirting tongues 126, evenly spaced about its edge, shaped for resiliently engaging said rib 128. Other means, such as screw means or a bayonet engagement can be made use of.

It is therefore evident that the above and other modifications and structural details are comprised within the spirit and scope of this invention.

I claim:

1. A heating vessel for milk, comprising a substantially cylindrical vessel having a side wall and a bottom wall; and transverse partition means subdividing said vessel into a larger volume upper chamber and a smaller-volume lower chamber, the volume of said lower chamber being approximately one-tenth of the volume of said upper chamber, said partition means having a predetermined area and including a segmental aperture in said transverse partition means communicating with said upper and lower chambers in the region of one peripheral portion of said partition means and adjacent to said side wall, said aperture having an effective area which is between 2 and 5 percent of said predetermined area of said partition means.

2. A vessel as defined in claim 1, said partition wall being spaced from said bottom wall by a distance of between substantially 1 – 2 cm.

3. A vessel as defined in claim 1, said partition wall having a circumferential edge; and wherein said aperture is a cut-out provided in said edge and extending inwardly thereof, said cut-out having an outwardly directed open side proximal to said side wall.

4. A vessel as defined in claim 3, said side wall having an upper region provided with a pouring spout, and said aperture being at least substantially vertically aligned with said pouring spout.

5. A vessel as defined in claim 1, said partition wall being a discrete element; and further comprising securing means removable securing said partition wall in said vessel body.

* * * * *